United States Patent [19]

Bettermann et al.

[11] Patent Number: 4,971,778
[45] Date of Patent: Nov. 20, 1990

[54] PROCESS FOR WORKING UP PHOSPHORIC ACID

[75] Inventors: Gerhard Bettermann; Günther Schimmel; Jens Tiedemann, all of Erftstadt, Fed. Rep. of Germany

[73] Assignee: Hoechst AG, Frankfurt am Main, Fed. Rep. of Germany

[21] Appl. No.: 508,891

[22] Filed: Apr. 12, 1990

[30] Foreign Application Priority Data

Apr. 27, 1989 [DE] Fed. Rep. of Germany ....... 3913853

[51] Int. Cl.$^5$ ............................................. C01B 25/32
[52] U.S. Cl. ..................................... 423/275; 423/309; 423/311; 423/321 R
[58] Field of Search ................... 423/321 R, 309, 311, 423/275

[56] References Cited

U.S. PATENT DOCUMENTS

| | | | |
|---|---|---|---|
| 2,132,349 | 10/1938 | Booth | 423/321 R |
| 3,193,331 | 7/1965 | Miller et al. | 423/321 R |
| 3,450,633 | 6/1969 | Siemers | 423/321 R |
| 4,160,657 | 7/1979 | Drechsel | 423/167 |
| 4,164,550 | 8/1979 | Hill | 423/321 R |
| 4,330,517 | 5/1982 | Michalski | 423/321 R |
| 4,347,228 | 8/1982 | Wolstein et al. | 423/321 R |
| 4,466,948 | 8/1984 | Schimmel et al. | 423/321 R |
| 4,713,229 | 12/1987 | Schimmel et al. | 423/321 R |

FOREIGN PATENT DOCUMENTS

| | | | |
|---|---|---|---|
| 0189062 | 7/1986 | European Pat. Off. | |
| 15459 | 5/1972 | Japan | 423/321 R |
| 6413920 | 5/1966 | Netherlands | 423/321 R |
| 2039869 | 8/1980 | United Kingdom | 423/321 R |

*Primary Examiner*—Wayne A. Langel
*Attorney, Agent, or Firm*—Connolly & Hutz

[57] ABSTRACT

For working up concentrated, preferably partially condensed phosphoric acid which is contaminated with organic components, the phosphoric acid is first thoroughly mixed with fine-grained sand in a weight ratio of (0.5 to 1.5):1. Then, to neutralize the mixture, a basic, oxygen-containing calcium compound is added, while the thorough mixing is continued, until a 10% aqueous suspension of the mixture to which the calcium compound has been added has a pH between 5 and 11. Finally, the mixture which contains the calcium compound is commminuted after cooling.

10 Claims, No Drawings

PROCESS FOR WORKING UP PHOSPHORIC ACID

The present invention relates to a process for working up concentrated phosphoric acid which is contaminated with organic components and preferably partially condensed.

A process is known from EP-OS No. 189,062 for converting residues which have been formed during the removal of heavy metals from wet phosphoric acid, using dialkyl dithiophosphoric acid and which, in addition to the heavy metals, contain phosphoric acid and dialkyl dithiophosphoric acid into solid products which are disposable. In this process, the residues are thoroughly mixed with such an amount of solid calcium oxide or calcium hydroxide that a 20% aqueous suspension of the resulting product has a pH of 5 to 12. The phosphorus compounds which are present in the product formed are virtually water-insoluble.

The disadvantage of the known process is that it can only be used for those residues which have only a low free acid content and can still be easily handled.

The object of the present invention is to provide a process for working up that type of phosphoric acid which, due to its high concentration and due to its content of organic components, has a highly viscous consistency and is therefore difficult to handle. According to the invention, fine-grained sand is added to this phosphoric acid in a weight ratio of (0.5 to 1.5):1 with thorough mixing, a basic, oxygen-containing calcium compound is added to the resulting mixture for neutralization, while the thorough mixing is continued, until a 10% aqueous suspension of the mixture to which the calcium compound has been added has a pH between 5 and 11, and the mixture which contains the calcium compound is comminuted after cooling.

A further alternative embodiment of the process according to the invention can also be one in which
(a) the sand has a particle size of less than 1 mm;
(b) the particle size of the sand is 0.3 to 0.8 mm;
(c) the weight ratio of phosphoric acid to sand is (0.9 to 1.1):1;
(d) the pH of the 10% aqueous suspension of the mixture to which the calcium compound has been added is 6 to 8;
(e) calcium oxide serves as the calcium-containing compound;
(f) calcium carbonate serves as the calcium-containing compound;
(g) the mixing is carried out in a kneader;
(h) the cooled mixture which contains the calcium compound is comminuted in a kneader;
(i) the cooled mixture which contains the calcium compound is comminuted by means of a mill.

In the process according to the invention, the mixing with the sand in the first step has the effect of eliminating the viscosity of the phosphoric acid which is present in a tar-like form by loosening its macroscopic structure.

In the process according to the invention, after the admixing of the sand, the neutralization takes place more easily and the use of cheap neutralizing agents (lime, limestone) leads to calcium phosphate which contains sand as a filler. Since both components of the neutralizate, in the form of crude phosphate and gravel, are starting materials for the electrothermal furnace to produce phosphorus, the comminuted neutralizate can be admixed to the finely divided crude phosphate for producing shaped or sintered compacts for use in the furnace for producing phosphorus.

In the process according to the invention, the cooled mixture which contains the calcium compound can also be comminuted by means of a crusher, in particular a chalk crusher.

In the context of the process according to the invention, concentrated phosphoric acid is understood to mean phosphoric acid which contains more than 50% by weight of $H_3PO_4$ ($\triangleq$ 36.2% by weight of $P_2O_5$).

Example 1 (Comparative Example)

2.5 kg of contaminated phosphoric acid (about 15% by weight of $C_{org}$; about 50% by weight of $P_2O_5$) were kneaded together with 1 kg of sand (particle size: 0.3 to 0.8 mm) for 10 minutes and, after the addition of 850 g of CaO, kneaded for a further 50 minutes. The resulting mixture had such a high viscosity that it could neither be crushed nor ground.

Example 2 (according to the invention)

2.5 kg of contaminated phosphoric acid (about 15% by weight of $C_{org}$; about 50% by weight of $P_2O_5$) were kneaded together with 2.5 kg of sand (grain size: 0.3 to 0.8 mm) for 10 minutes. After the addition of 850 g of calcium oxide, kneading was continued for 50 minutes. The neutralizate was removed from the kneader for cooling; its 10% aqueous suspension had a pH of 9.0. The cooled neutralizate was comminuted by further kneading to particle sizes of less than 5 cm over a period of 20 minutes.

Example 3 (according to the invention)

Example 2 was repeated except that the neutralization was carried out using 1,100 g of calcium hydroxide. The resulting 10% aqueous suspension of the cooled neutralizate had a pH of 8.5. The cooled neutralizate could be comminuted without difficulties in a jaw crusher to particle sizes of less than 1 cm.

Example 4 (according to the invention)

Example 2 was repeated, except that the neutralization was carried out using 1,500 g of calcium carbonate. The resulting 10% aqueous suspension of the cooled neutralizate had a pH of 8.0. The cooled neutralizate could be ground without difficulties in a mill to particle sizes of less than 1 mm.

We claim:

1. A process for working up concentrated, partially condensed phosphoric acid which is contaminated with organic components, which comprises thoroughly mixing the phosphoric acid with fine-grained sand in a weight ratio of (0.5 to 1.5):1; adding a basic, oxygen-containing calcium compound, while the thorough mixing is continued, to neutralize the resulting mixture, until a 10% aqueous suspension of the mixture to which the calcium compound has been added has a pH between 5 and 11; and comminuting the mixture which contains the calcium compound after cooling.

2. The process as claimed in claim 1, wherein the sand has a particle size of less than 1 mm.

3. The process as claimed in claim 2, wherein the particle size of the sand is 0.3 to 0.8 mm.

4. The process as claimed in claim 1, wherein the weight ratio of phosphoric acid to sand is (0.9 to 1.1):1.

5. The process as claimed in claim 1, wherein the pH of the 10% aqueous suspension of the mixture to which the calcium compound has been added is 6 to 8.

6. The process as claimed in claim 1, wherein calcium oxide serves as the calcium-containing compound.

7. The process as claimed in claim 1, wherein calcium carbonate serves as the calcium-containing compound.

8. The process as claimed in claim 1, wherein the mixing is carried out in a kneader.

9. The process as claimed in claim 1, wherein the cooled mixture which contains the calcium compound is comminuted in a kneader.

10. The process as claimed in claim 1, wherein the cooled mixture which contains the calcium compound is comminuted by means of a mill.

* * * * *